US008988731B2

(12) United States Patent
Wang et al.

(10) Patent No.: US 8,988,731 B2
(45) Date of Patent: Mar. 24, 2015

(54) WIDE-FORMAT COLOR PRINTER

(75) Inventors: Jiwei Wang, Zhengzhou (CN); Dawei Wang, Zhengzhou (CN); Lei Yao, Zhengzhou (CN); Bingbing Zhao, Zhengzhou (CN)

(73) Assignee: Zhengzhou Lecai Science and Technology Co., Ltd., Henan (CN)

( * ) Notice: Subject to any disclaimer, the term of this patent is extended or adjusted under 35 U.S.C. 154(b) by 359 days.

(21) Appl. No.: 13/518,178

(22) PCT Filed: Mar. 28, 2011

(86) PCT No.: PCT/CN2011/072209

§ 371 (c)(1),
(2), (4) Date: Jun. 21, 2012

(87) PCT Pub. No.: WO2012/022153

PCT Pub. Date: Feb. 23, 2012

(65) Prior Publication Data

US 2012/0262743 A1 Oct. 18, 2012

(30) Foreign Application Priority Data

| | | |
|---|---|---|
| Aug. 17, 2010 | (CN) | 2010 2 0293452 U |
| Aug. 17, 2010 | (CN) | 2010 2 0293466 U |
| Aug. 17, 2010 | (CN) | 2010 2 0293484 U |
| Aug. 17, 2010 | (CN) | 2010 2 0293489 U |
| Dec. 24, 2010 | (CN) | 2010 2 0681413 U |

(51) Int. Cl.
*H04N 1/46* (2006.01)
*B41J 19/20* (2006.01)
(Continued)

(52) U.S. Cl.
CPC ................ *B41J 19/20* (2013.01); *B41J 11/001* (2013.01); *B41J 11/002* (2013.01); *B41J 11/0085* (2013.01); *B41J 19/005* (2013.01)
USPC ............ 358/1.9; 358/502; 358/401; 399/107; 347/86; 347/91

(58) Field of Classification Search
CPC ...... B41J 2/16585; B41J 2/175; B41J 19/005; B41J 29/02; B41J 2/1752; B41J 29/38; B41J 19/202
USPC .................. 358/501, 502, 401, 296; 399/107; 347/20, 42, 86, 91, 100; D18/56, 58, D18/59, 50
See application file for complete search history.

(56) References Cited

U.S. PATENT DOCUMENTS 4,330,218 A * 5/1982 Habich et al. .............. 400/144.2
5,158,376 A 10/1992 Alessandro et al.

(Continued)

FOREIGN PATENT DOCUMENTS

CN 2858273 1/2007
CN 2858274 1/2007

(Continued)

OTHER PUBLICATIONS

English translation of Abstract of JP62101478 published Nov. 5, 1987.

(Continued)

*Primary Examiner* — Jamares Q Washington
(74) *Attorney, Agent, or Firm* — Vierra Magen Marcus LLP

(57) ABSTRACT

A wide-format color printer includes a carriage, an ink carrier (2) disposed on the carriage, a motor (3) for driving the carriage and a guide-rail frame (4). The motor is mounted on the carriage and a motor wheel (3-1) of the motor is fitted to a guide rail (4-1) of the guide-rail frame. An anti-friction strip (6) is disposed on the bottom of the guide rail. The carriage includes a carriage frame (1-1) and a motor holder (1-2). The ink carrier is buckled to a front end face of the carriage frame. The motor is fixed to the motor holder. The motor holder is connected to the carriage frame through an elastic member (5) on the top of the motor holder. The motor of the printer drives directly the carriage frame to move on the guide rail of the guide-rail frame reciprocally. A transmission without a belt or a wire rope is achieved and a stable sliding of the ink carrier during the transmission is ensured, so fitting problems previously caused by belt transmission or wire rope transmission are solved, and thus printing accuracy, printing speed and printing stability are improved.

9 Claims, 7 Drawing Sheets

(51) Int. Cl.
*B41J 11/00* (2006.01)
*B41J 19/00* (2006.01)

(56) References Cited

U.S. PATENT DOCUMENTS

| | | | | |
|---|---|---|---|---|
| 5,488,396 | A | 1/1996 | Burke et al. | |
| 5,612,768 | A * | 3/1997 | Kim et al. | 399/92 |
| 5,634,401 | A * | 6/1997 | Weaver | 101/416.1 |
| 5,992,994 | A | 11/1999 | Rasmussen et al. | |
| 8,538,286 | B2 * | 9/2013 | Brown et al. | 399/92 |
| 2005/0252394 | A1 * | 11/2005 | Eppinger | 101/123 |
| 2009/0257806 | A1 * | 10/2009 | Dewey | 400/354 |
| 2011/0096123 | A1 * | 4/2011 | Silverbrook | 347/49 |

FOREIGN PATENT DOCUMENTS

| | | |
|---|---|---|
| CN | 101274511 | 10/2008 |
| JP | 62101478 | 11/1987 |
| JP | 02147275 | 6/1990 |
| JP | 03042263 | 2/1991 |
| JP | H03264374 | 11/1991 |
| JP | H06155839 | 6/1994 |
| JP | 06320822 | 11/1994 |
| JP | 08197802 | 8/1996 |
| JP | 9-131939 | 5/1997 |
| JP | 09141964 | 6/1997 |
| JP | H11505190 | 5/1999 |
| JP | 2000313129 | 11/2000 |
| JP | 2009023170 | 2/2009 |
| WO | 9728003 | 8/1997 |

OTHER PUBLICATIONS

English translation of Abstract of JP02147275 published Jun. 6, 1990.
English translation of Abstract of JP03042263 published Feb. 22, 1991.
English translation of Abstract of JP06320822 published Nov. 22, 1994.
English translation of Abstract of JP08197802 published Aug. 6, 1996.
English translation of Abstract of JP09141964 published Jun. 3, 1997.
English translation of Abstract of JP2000313129 published Nov. 14, 2000.
English translation of Abstract of JP2009023170 published Feb. 5, 2009.
Machine translation of JP06320822 published Nov. 22, 1994, 8 pages.
Machine translation of JP08197802 published Aug. 6, 1996, 23 pages.
Machine translation of JP09141964 published Jun. 3, 1997, 8 pages.
Machine translation of JP2000313129 published Nov. 14, 2000, 12 pages.
Machine translation of JP2009023170 published Feb. 5, 2009, 19 pages.
PCT International Search Report dated Jul. 7, 2011, PCT Patent Application No. PCT/CN2011/072209.
English translation of Abstract of Chinese Patent Application No. CN2858273.
English translation of Abstract of Chinese Patent Application No. CN2858274.
English translation of Abstract of Chinese Patent Application No. CN101274511.
English translation of Abstract of Japanese Patent Application No. JP9-131939.
English translation of Abstract of JP03-264374 published Nov. 25, 1991.
English translation of Abstract of JP06-155839 published Jun. 3, 1994.
English translation of Abstract of JP11-505190 published May 18, 1999.
Partial English translation of JP11-505190 published May 18, 1999.

* cited by examiner

WIDE-FORMAT COLOR PRINTER

The present application claims the benefit of priorities to the following Chinese patent applications, the entire disclosures of which are incorporated herein by reference:

1. the Chinese patent application No. 201020293489.3 titled “air blower system of inkjet photo printer”, filed with the Chinese State Intellectual Property Office on Aug. 17, 2010;
2. the Chinese patent application No. 201020293466.2 titled “guide rail moving mechanism of inkjet photo printer”, filed with the Chinese State Intellectual Property Office on Aug. 17, 2010;
3. the Chinese patent application No. 201020293452.0 titled “installation system for paper pressure flap”, filed with the Chinese State Intellectual Property Office on Aug. 17, 2010;
4. the Chinese patent application No. 201020293484.0 titled “installation system for paper feeding wheel”, filed with the Chinese State Intellectual Property Office on Aug. 17, 2010; and
5. the Chinese patent application No. 201020681413.8 titled “wide-format color printer”, filed with the Chinese State Intellectual Property Office on Dec. 24, 2010.

FIELD OF THE INVENTION

The present application relates to the technical field of printing equipments, and in particular to a printer having a wide-format inkjet printing function.

BACKGROUND OF THE INVENTION

With the development and the fierce competition in the advertising graphic industry, the user also has the increased requirements for the accuracy, the speed and the stability of the wide-format color printer.

The wide-format color printer is a printing equipment for painting various color patterns on special materials with a nozzle, and can be interpreted as a large format printer, which has a format generally about 1.52 meter, has a relatively high painting quality, and is mainly used in the advertising, graphic and CAD industry for making indoor spay-painting products, for example the indoor stickers, the presentation boards, the publicizing pictures, the posters, the rules and regulations, etc.

A carriage frame system is a core component of the wide-format color printer having a highest running frequency, and includes a carriage frame, a carriage board, a nozzle and other parts. After receiving an instruction, an electric motor drives the carriage frame assembly to work. The carriage frame carrying the carriage board and the nozzle moves rightward and leftward, thereby painting a color pattern on the special material.

Thus, the stability of the carriage frame system determines the final output effect of the wide-format color printer, and is the key for affecting the quality of the wide-format color printer.

At present, the moving mechanism of the carriage frame assembly of the wide-format color printer in the market mostly make transmission by a belt or a steel wire rope. Due to some factors such as the elasticity of the belt and slipping between the belt and the pulley, the belt transmission has an unbalanced transmission force, an unstable torque transmission and a short service life, and is hard to assemble, resulting in a low assembling efficiency. The steel wire rope transmission is complex and has a very high cost, and similarly has some disadvantages, such as difficulty in assembling and low transmission efficiency.

In addition, the conventional wide-format color printer further has the following disadvantages.

Firstly, the carriage moving guide rail and the rotating system are independent relative to each other. The carriage moving guide rail has a poor rigidity and is easy to be deformed, causing an unstable movement. Moreover, the printing quality is directly affected by the great interference and the vibration generated from the belt transmission, the steel wire transmission or the steel belt transmission.

Secondly, the paper feeder body below the ink carrier and the fan at the front side are structurally independent relative to each other. The fan only has the air blowing function, and can not heat the painted printing material. Thus, the printing quality is decreased due to the poor drying effect. For solving the above problem, a solution is to increase the volume of the fan. However, as such, other problems may occur, such as uneven speed of the drying air and difficulty in fixing. Further, the gas inside the paper feeder is directly expelled out by a negative pressure fan at the bottom of the paper feeder, and thus can not be reused well.

Furthermore, the paper pressure flap is of a spring-loaded elastic structure, and the loading or unloading of the material needs to be done manually, or by the movement of the machine. In such a manner, the spring pressure is uneven, and the paper is prone to run incorrectly when feeding, such as, inclined paper feeding, excessive (or insufficient) paper feeding or the like.

Finally, the paper feeding wheel is directly fixed on the surface of the paper feeder body vertically. With the above installation method, there are a low precision, a high damage rate, a difficulty in fixing, and the inconvenient assembling, and a deformation is easy to happen after assembling, resulting in the poor operational stability.

Therefore, a technical problem to be solved presently by those skilled in the art is to improve a printing precision, speed and stability of the wide-format color printer.

SUMMARY OF THE INVENTION

The object of the present application is to provide a wide-format color printer. A motor of the printer directly drives a carriage frame to move on a guide rail of a guide rail bracket reciprocally, and the movement of a carriage is directly driven by the motor without a belt transmission or a steel wire rope transmission, thereby ensuring the stable slide of an ink carrier during the transmission process, completely solving the assembling disadvantages of the belt transmission and the steel wire rope transmission in the prior art, and significantly improving the printing precision, speed and stability.

To realize the above objects, the present application provides a wide-format color printer, including a carriage, an ink carrier provided on the carriage, a motor for driving the carriage, and a guide rail bracket. The motor is mounted on the carriage, and motor wheels of the motor are engaged with guide rails of the guide rail bracket. A wear-resistant strip is provided at a bottom portion of each of the guide rails.

Preferably, the carriage includes a carriage frame and a motor fixing bracket. The ink carrier is fastened at a front end surface of the carriage frame. The motor is fixed on the motor fixing bracket. The motor fixing bracket is connected to the carriage frame via an elastic member of a top portion of the motor fixing bracket.

Preferably, a bearing pulley block is provided on the carriage and is slidably connected to a plain shaft on the guide rail bracket.

Preferably, the guide rails are located at top portions of two sides of the guide rail bracket, or located on two inner side surfaces of the guide rail bracket.

Preferably, the printer further includes a paper feeder body provided below the guide rail bracket. Air outlets of a negative pressure fan located inside the paper feeder body communicate with air inlets of a drying air duct provided located at a front side of the paper feeder body.

Preferably, the drying air duct is a duckbilled drying air duct. The air outlets of the negative pressure fan are located at bottom portions of two ends of the paper feeder body, and bended air transporting ducts are provided between the air outlets of the negative pressure fan and the air inlets located at two ends of the drying air duct.

Preferably, a heating device is provided inside the drying air duct.

Preferably, paper feeding wheels mounted from a side of the paper feeder body are provided in a cavity of the paper feeder body, and bearings at two ends of a rotation shaft of the paper feeding wheel are supported by paper feeding wheel end covers and are fixed at two ends of the paper feeder body respectively.

Preferably, the printer further includes a paper pressure flap and a paper lift-press adjusting shaft. A rear end of the paper pressure flap is mounted at a rear end of a bottom portion of the guide rail bracket, and a front end of the paper pressure flap elastically presses against the paper feeding wheels of the paper feeder body. The paper lift-press adjusting shaft is rotatably mounted at a front side of the bottom portion of the guide rail bracket. A paper press lever is provided at one end of the paper lift-press adjusting shaft, and a protrusion is provided on an outer circumferential surface of the paper lift-press adjusting shaft and is configured to tilting the paper pressure flap.

Preferably, the paper lift-press adjusting shaft is mounted in a circular hole at the bottom portion of the guide rail bracket, and a cross section of the paper lift-press adjusting shaft is of a comma shape with a tail portion pointing forward.

The wide-format color printer provided by the present application is an improvement over the prior art, wherein the motor for driving the carriage is mounted on the carriage, the motor wheels of the motor are engaged with the guide rails of the guide rail bracket, and the wear-resistant strip is provided at the bottom portion of the guide rail. When the motor drives the motor wheels at two ends to rotate, the carriage is directly driven by the friction force produced between the motor wheels and the wear-resistant strip, and under the position limiting action of other members, the carriage may do horizontal linear movement on the guide rail bracket reciprocally, thereby realizing the transmission without a belt or a steel wire rope, ensuring the stable slide of the ink carrier during the transmission process, completely solving the assembling disadvantages of the belt transmission and the steel wire rope transmission in the prior art, and significantly improving the printing precision, speed and stability.

In an embodiment, the motor fixing bracket is connected to the carriage frame via the elastic member of the top portion of the motor fixing bracket. The weight of the carriage frame is counteracted by an upward supporting force of the elastic member. Thus, it is possible to allow the carriage frame to be in suspension state with a mechanic structure. In this way, during moving process, the carriage is only driven by the friction between the motor wheels and the wear-resistant strips in the guide rails. The bearing pulley block device at two sides of the carriage only has a position limiting function and may move. Thus, the friction between the bearing pulley of the carriage and the plain shaft is reduced, both the operational life of the ink carrier and the operational stability of the ink carrier are improved. Damages to the mechanical parts are avoided while ensuring the printing effect, and the maintenance is convenient.

REFERENCE NUMERALS IN THE FIGURES

| | | |
|---|---|---|
| 1-1 carriage frame; | 1-1-1 first bearing pulley block; | |
| 1-1-2 second bearing pulley block; | 1-2 motor fixing bracket; | 2 ink carrier; |
| 3 motor; | 3-1 motor wheel; | 4 guide rail bracket; |
| 4-1 guide rail; | 5 spring; | 6 wear-resistant strip; |
| 7-1 first plain shaft; | 7-2 second plain shaft; | 8 paper feeder body; |
| 8-1 rectangular hole; | 9 negative pressure fan; | 10 air transporting duct; |
| 11 duckbilled air duct; | 12 paper feeding wheel; | 12-1 rotation shaft; |
| 13 bearing; | 14 paper feeding wheel end cover; | |
| 15 paper pressure flap; | 15-1 elastic arm; | 15-2 roller; |
| 16 paper lift-press adjusting shaft; | 17 paper press lever. | |

DETAILED DESCRIPTION OF THE EMBODIMENTS

The object of the present application is to provide a wide-format color printer having a high printing precision, speed and stability.

For those skilled in the art to better understand technical solutions of the present application, the present application will be described in further detail in conjunction with drawings and embodiments hereinafter.

Terms "first" and "second" herein are only used to facilitate describing, to distinguish different components having the same name, and are not intended to indicate the order or the primary or secondary relationship. Similarly, terms indicating the directions and positions, such as "up, down, front and rear", are based on the position relationship of the drawings, are also used to facilitate describing, and should not be interpreted as absolute limitation to the protection scope of the present application.

Figure 1:
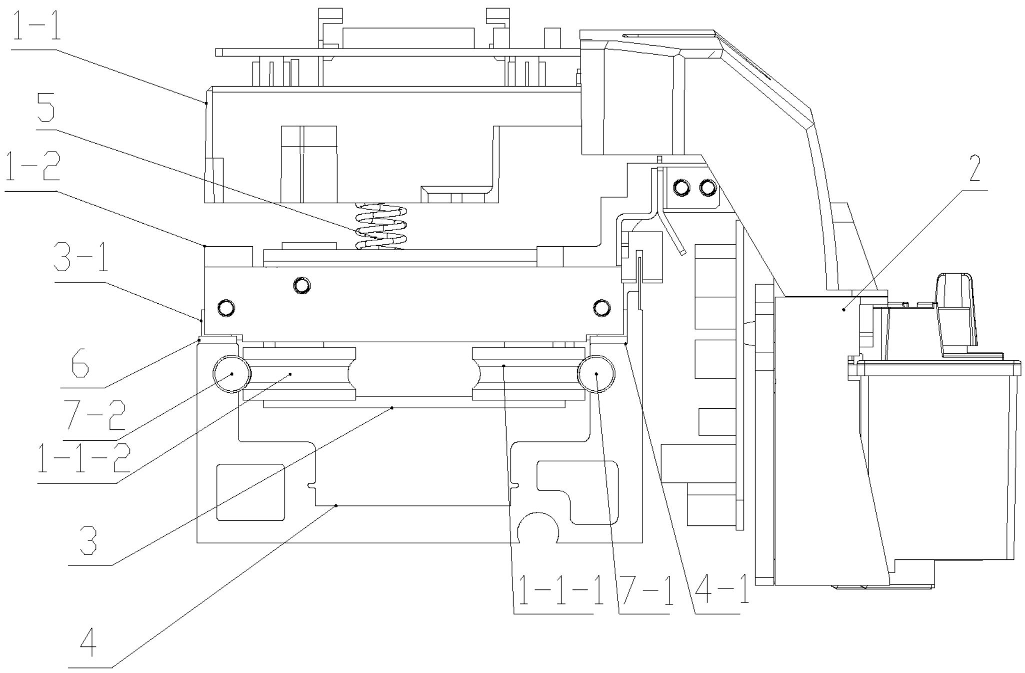
FIG. 1 is a structural schematic view of one embodiment of a printing device of a wide-format color printer according to the present application.
Figure 2:
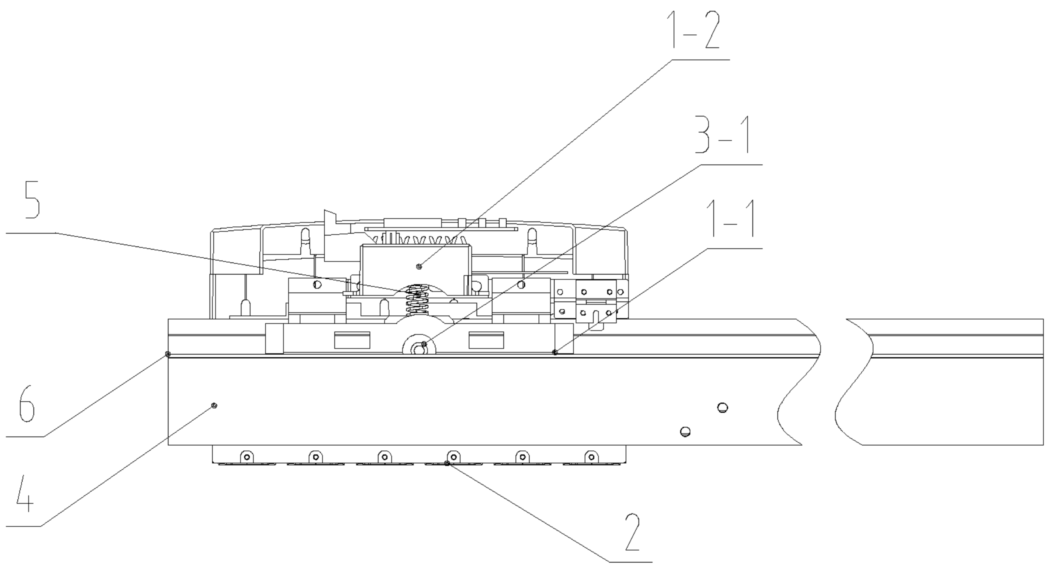
FIG. 2 is a left view of the printing device shown in FIG. 1.
Figure 3:
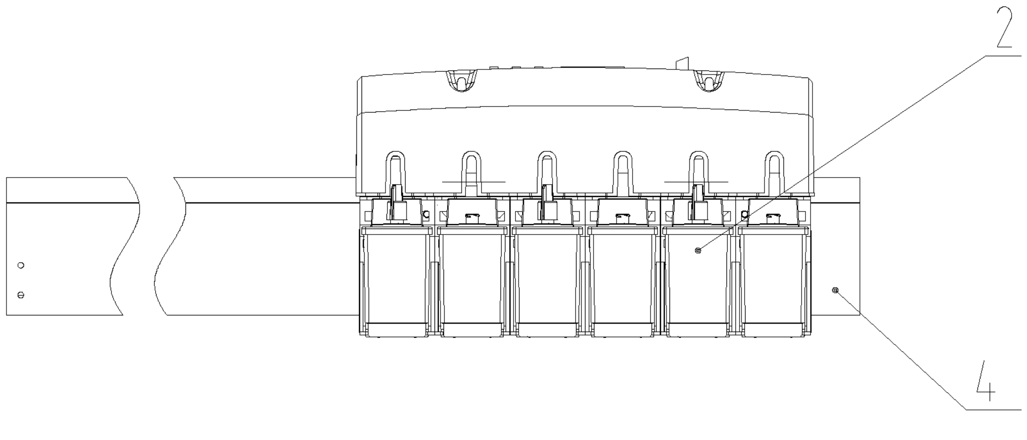
FIG. 3 is a right view of the printing device shown in FIG. 1.

Referring to FIGS. 1 to 3, FIG. 1 is a structural schematic view of one embodiment of a printing device of a wide-format color printer according to the present application; FIG. 2 is a left view of the printing device shown in FIG. 1; and FIG. 3 is a right view of the printing device shown in FIG. 1.

In an embodiment, a printing device of the wide-format color printer according to the present application includes a carriage, an ink carrier 2, a motor 3 and a guide rail bracket 4. A carriage frame 1-1 and a motor fixing bracket 1-2 are assembled together to form the carriage.

The ink carrier 2 is directly fastened at a front end surface of the carriage frame 1-1. The motor 3 is fixed on the motor fixing bracket 1-2. A spring 5 (or an elastic sheet) is provided at a top portion of the motor fixing bracket 1-2 and is connected to the carriage frame 1-1. A cross section of the guide rail bracket 4 is of a "U" shaped structure. The motor 3, together with the motor fixing bracket 1-2, is locate in the guide rail bracket 4. A guide rail 4-1 is provided at a top portion of two sides of the guide rail bracket 4. Motor wheels 3-1 at two ends of the motor 3 are supported by the guide rail 4-1. A wear-resistant strip 6 is attached to a bottom portion of the guide rail 4-1. The motor 3 is connected to a specific control circuit board.

The wear-resistant strip 6 may be formed of a sheet-like material having a certain roughness and wear-resistant performance, such as a nylon material. The sheet-like material is cut such as to have a dimension conformable to the guide rail 4-1, and is then laid at the bottom portion of the guide rail 4-1 contacting the motor wheel 3-1.

The carriage 1-1 is an "L" shaped member. A first bearing pulley block 1-1-1 and a second bearing pulley block 1-1-2 are provided at two sides of a bottom portion of the motor fixing bracket 1-2. The number of the first bearing pulley block 1-1-1 and the second bearing pulley block 1-1-2 may be properly selected such as to allow the smooth operation of the carriage, that is, it may be one or above.

A circular groove may be provided on each of two inner side surfaces of the guide rail bracket 4. A first plain shaft 7-1 and a second plain shaft 7-2 pass through the two circular grooves respectively, with major portions of them being in the two circular grooves and the other minor portions thereof protruding outward from the two circular grooves, and are retained on the guide rail bracket 4 by closing portions of the two circular grooves. The first bearing pulley block 1-1-1 and the second bearing pulley block 1-1-2 on the motor fixing bracket 1-2 are slidably connected to the first plain shaft 7-1 and the second plain shaft 7-2 respectively so as to limit the position of the carriage.

When the motor 3 drives the motor wheels 3-1 at two ends of the motor 3 to rotate, the carriage is directly driven by the friction force produced between the motor wheels 3-1 and the wear-resistant strip 6, and under the position limiting action of other members, the carriage may do horizontal linear reciprocating movement on the guide rail bracket 4, thus realizing the transmission with no belt or steel wire rope, ensuring the stable sliding of the ink carrier 2 during the transmission process, completely solving the assembling disadvantages of the belt transmission and the steel wire rope transmission in the prior art, and significantly improving the printing precision, speed and stability.

In addition, the weight of the carriage frame 1-1 is counteracted by an upward supporting force of the spring 5. Thus, it is possible to allow the carriage frame 1-1 to be in suspension state with a mechanic structure. In this way, during moving process, the carriage is only driven by the friction between the motor wheels 3-1 and the wear-resistant strips 6 of the guide rails, instead of being driven by the bearing pulley blocks at two sides of the carriage, and thus the friction between the carriage frame 1-1 and the plain shaft is reduced, increasing both the operational speed of the ink carrier 2 and the operational stability of the ink carrier 2. Accordingly, damages to the mechanical parts are avoided while ensuring the printing effect, and the maintenance is convenient.

The specific positions of the guide rail, the bearing pulley blocks and the plain shafts described above may be adjusted depending on the actual needs, and are not limited to the above preferred solutions. For example, as an alternative solution, the guide rail may be formed by providing guide slots on the two inner side surfaces of the guide rail bracket, with the cross sections of the two guide slots being rectangular. Motor wheels at two ends of the motor are located in the guide slots. Bottom portions of the guide slots are adhered with wear-resistant strips. The carriage frame is of an "L" shape, a first bearing pulley is fixed on an inner side of a lower end of a front portion of the carriage frame, and a second bearing pulley is fixed below a top end of a rear portion of the carriage frame. Circular grooves are provided at an outer side of the lower end of the front portion of the guide rail bracket and an outer side of the top end of the rear portion of the guide rail bracket. A first plain shaft and a second plain shaft pass through the two circular grooves, respectively. The first bearing pulley and the second bearing pulley on the carriage frame are slidably connected to the first plain shaft and the second plain shaft respectively, similarly performing the function of limiting the position of the carriage.

Figure 4:
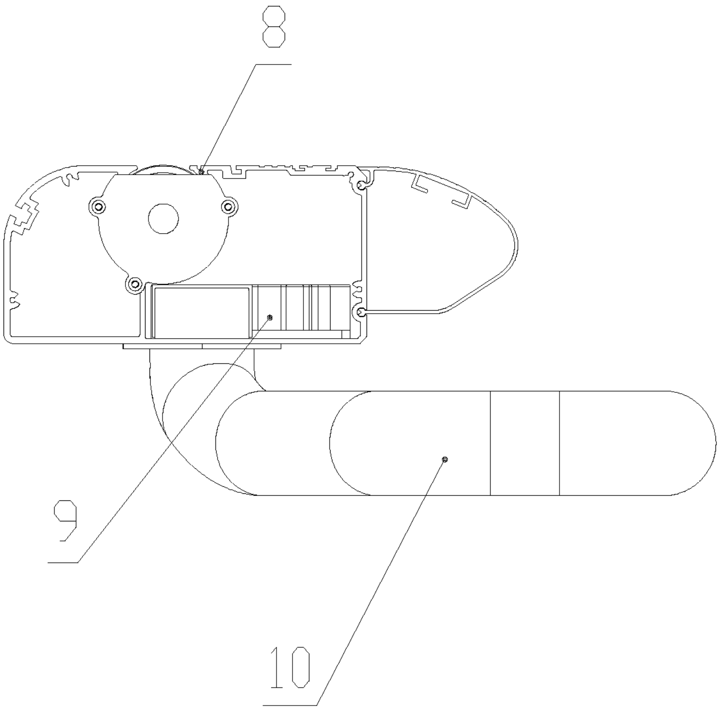
FIG. 4 is a structural schematic view of an air blowing device of a wide-format color printer according to the present application.
Figure 5:
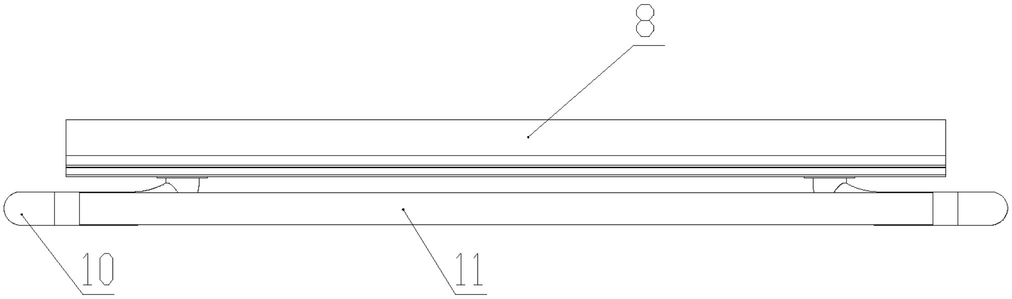
FIG. 5 is a right view of the air blowing device shown in FIG. 4.
Figure 6:
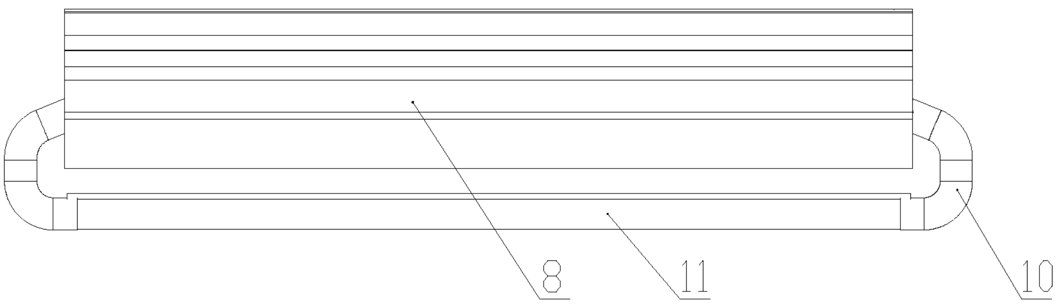
FIG. 6 is a top view of the air blowing device shown in FIG. 5.

Referring to FIGS. 4 to 6, FIG. 4 is a structural schematic view of an air blowing device of a wide-format color printer according to the present application; FIG. 5 is a right view of the air blowing device shown in FIG. 4; and FIG. 6 is a top view of the air blowing device shown in FIG. 5.

In another embodiment, a paper feeder body 8 is provided below the guide rail bracket 4. A hole is provided at a front end surface of the paper feeder body 8, in which a negative pressure fan 9 is provided. Air outlets of the negative pressure fan 9 are located at bottom portions of two ends of the paper feeder body 8, and are connected to air inlets of bended air transporting ducts 10 at the two ends of the paper feeder body 8. Air outlets of the air transporting ducts 10 are connected to duckbilled air ducts 11. The duckbilled air ducts 11 are located in front of the paper feeder body 8 and are each provided with a heating device (not shown) therein. Heated gas is blown out through a duckbilled opening.

During the working process of the wide-format color printer, for avoiding an error caused by the warping of the material when the material passes on an upper platform of the paper feeder body 8, the hole is provided at the front end surface of the paper feeder body 8, and the negative pressure fan 9 is provided in the hole to suck in air so as to realize an effect of keeping the material flat by the suction. Expelled waste air is expelled through the air transporting ducts 10 at two ends and directly into the duckbilled air ducts 11 to be heated, and then the heated air is blown out through the duckbilled opening so as to realize an inkjet drying effect.

The waste air immediately expelled out from the air blowing system is transported to the duckbilled air ducts via the air transporting ducts 10, and then heats and makes the inkjet product dry, which realizes an object of combining the heat energy and the wind power, solving disadvantages of the conventional printer, such as a conventional fan having a large volume, a poor drying effect, an uneven drying air speed, only having air blowing function and having no heating function. Further, the printer according to the present application has advantages, such as having a simple structure and being easy to install.

Figure 7:
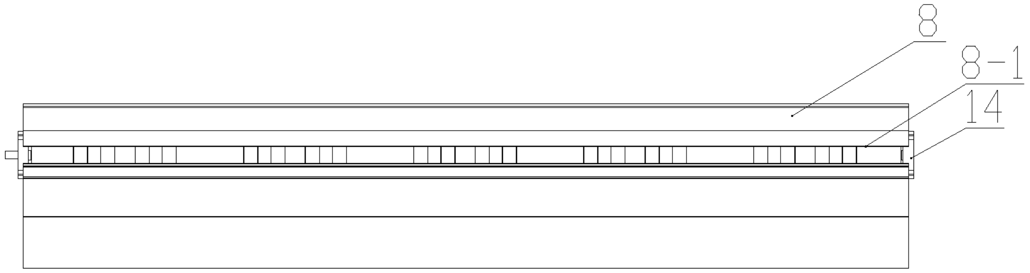
FIG. 7 is a structural schematic view of a paper feeding device of a wide-format color printer according to the present application.
Figure 8:
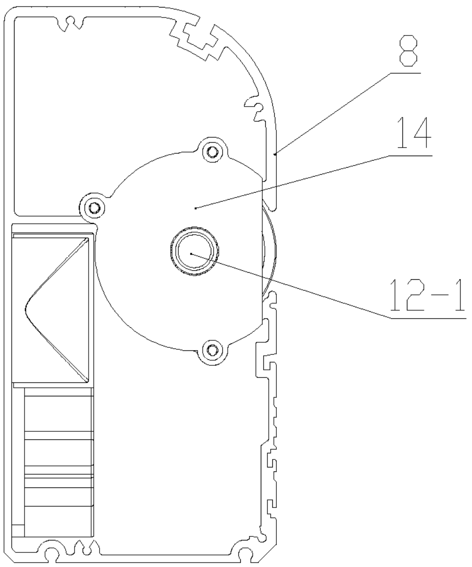
FIG. 8 is a left view of the paper feeding device shown in FIG. 7.
Figure 9:
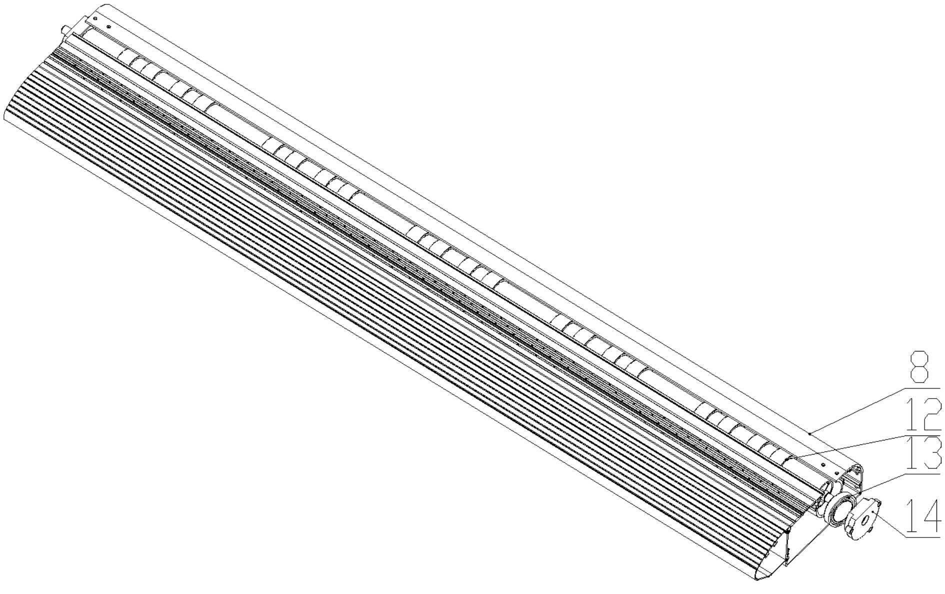
FIG. 9 is an exploded view of an end portion of the paper feeding device shown in FIG. 7.

Referring to FIGS. 7 to 9, FIG. 7 is a structural schematic view of a paper feeding device of a wide-format color printer according to the present application; FIG. 8 is a left view of the paper feeding device shown in FIG. 7; and FIG. 9 is an exploded view of an end portion of the paper feeding device shown in FIG. 7.

As shown in the figures, rectangular holes 8-1 in a row are provided in a top surface of the paper feeder body 8, and are in one-to-one correspondence with paper feeding wheels 12 in the cavity of the paper feeder body 8. The paper feeding wheels 12 protrude out of respective rectangular holes by a relatively small distance such as to be in contact with a lower surface of the paper and drive the paper to move forward. The paper feeding wheels 12 are mounted on a rotation shaft 12-1, and are installed into the cavity of the paper feeder body 8 from a side of the paper feeder body 8 together with the rotation shaft 12-1. Two ends of the rotation shaft 12-1 are fixed in inner circles of bearings 13, and the bearings 13 are supported by paper feeding wheel end covers 14 and are fixed in inner sides of two end surfaces of the paper feeder body 8 respectively.

The paper feeding wheels 12 are installed into the central cavity of the paper feeder body 8 and are directly fixed at two ends of the paper feeder body 8 via the paper feeding wheel end covers 14, which solves the disadvantages in the prior art that the paper feeding wheels are not fixed firmly and are easy to break. Thus, the printer according to the present application is operated easily and conveniently, and is helpful in improving the printing precision and quality.

Figure 10:
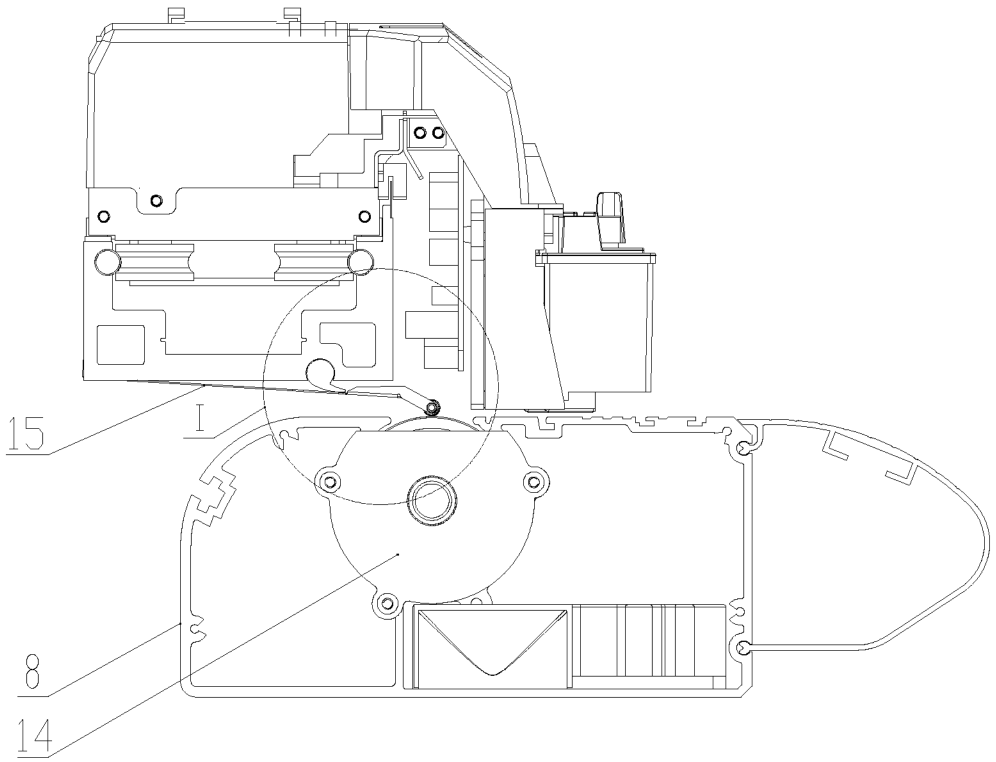
FIG. 10 is a structural schematic view of a paper pressing device of a wide-format color printer according to the present application.
Figure 11:
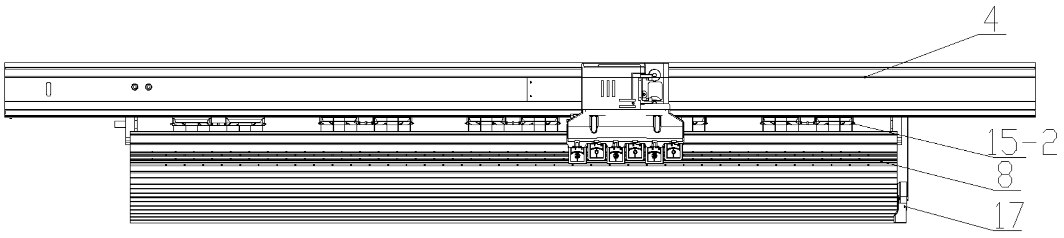
FIG. 11 is a left view of the paper pressing device shown in FIG. 10.
Figure 12:
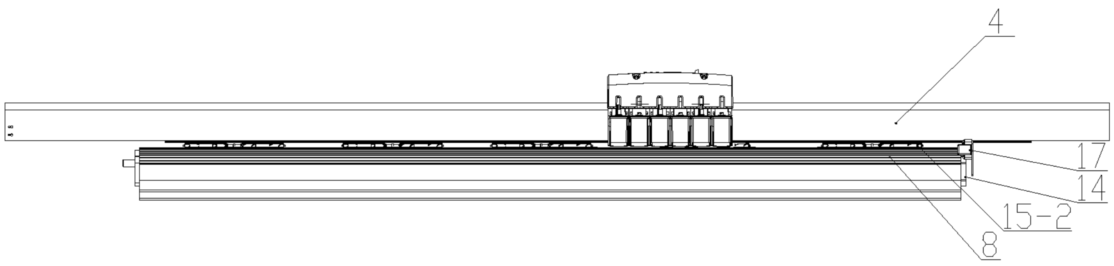
FIG. 12 is a right view of the paper pressing device shown in FIG. 10.
Figure 13:
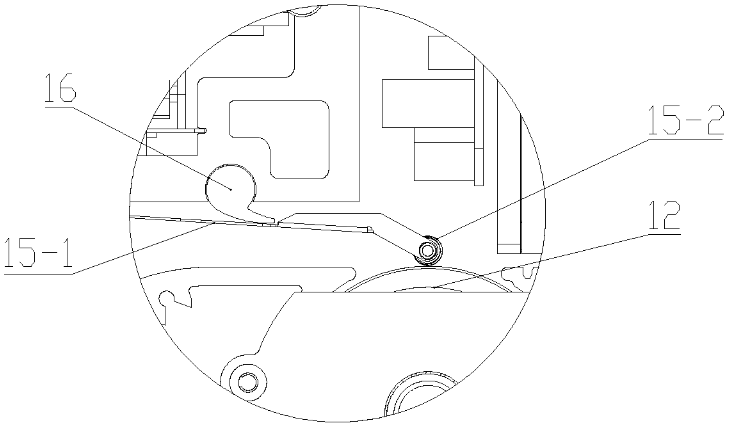
FIG. 13 is a partial enlarged view of portion I in FIG. 10.

Referring to FIGS. 10 to 12, FIG. 10 is a structural schematic view of a paper pressing device of the wide-format color printer according to the present application; FIG. 11 is a left view of the paper pressing device shown in FIG. 10; FIG. 12 is a right view of the paper pressing device shown in FIG. 10; and FIG. 13 is a partial enlarged view of portion I in FIG. 10.

As another improvement, multiple sets of paper pressure flap 15 and paper lift-press adjusting shaft 16 are provided at bottom portion of the guide rail bracket 4.

The paper pressure flap 15 includes an "L" shaped elastic arm 15-1 and a roller 15-2 at a front end of the elastic arm 15-1. A rear end of the elastic arm 15-1 is fixed at a rear end of the bottom portion of the guide rail bracket 4, and the roller 15-2 are supported on the paper feeding wheel 12 under the elastic force of the elastic arm 15-1. The paper lift-press adjusting shaft 16 is fitted in a circular groove of a bottom portion of a front side of the guide rail bracket 4. A paper press lever 17 is provided at one end of the paper lift-press adjusting shaft 16. A cross section of the paper lift-press adjusting shaft 16 is of a comma shape with a tail portion pointing forward. A protrusion formed of the tail portion of the paper lift-press adjusting shaft 16 is configured to tilt the paper pressure flap 15 from the underside of the paper pressure flap 15.

In use, by rotating the paper press lever 17, the paper lift-press adjusting shaft 16 is driven to rotate, and then the paper pressure flap 15 is tilted by the protrusion on the paper lift-press adjusting shaft 16 such as to elastically press on a wheel surface of the paper feeding wheel 12 for realizing a tension function. Thus, when moving, the paper feeing wheel 12 can drive the material to move, thereby realizing the paper feeding function. By rotating back the paper press lever 17, the protrusion on the paper lift-press adjusting shaft 16 rotates back, and the paper pressure flap 15 returns such that a clearance is generated between the paper pressure flap 15 and a surface of the paper feeder body 8, thereby facilitating the loading or unloading of the material.

Certainly, the shape of the cross section of the paper lift-press adjusting shaft 16 is not limited to the comma shape, and may also be other cam shapes, as long as it has the function of raising or releasing the paper pressure flap 15. There are many ways to realize the above function, which will not be illustrated herein.

By pressing the paper under the elastic force of the paper pressure flap 15, the paper feeding precision is improved, and the pressing force may be adjusted by the paper lift-press adjusting shaft 16, thereby avoiding disadvantages in the prior art, such as the inclined paper feeding and the excessive (or insufficient) paper feeding due to the uneven pressing force of the spring caused by assembling and feeding paper incorrectly. Accordingly, the printer according to the present application has some advantages, such as the uniform pressing force on the paper feeing wheel, feeding paper smoothly and flatly, and the accurate paper feeding.

The wide-format color printer provided by the present application is described in detail hereinbefore. The principle and the embodiments of the present application are illustrated herein by way of specific examples. The above description of examples is only intended to help the understanding of the spirit of the present application. It should be noted that, for the person skilled in the art, many modifications and improvements may be made to the present application without departing from the principle of the present application, and these modifications and improvements are also deemed to fall into the protection scope of the present application defined by the claims.

What is claimed is:

1. A wide-format color printer comprising a carriage, an ink carrier provided on the carriage, a motor for driving the carriage, a guide rail bracket, wherein the motor is mounted on the carriage, motor wheels of the motor are engaged with guide rails of the guide rail bracket, and a wear-resistant strip is provided at a bottom portion of each of the guide rails, wherein the printer further comprises a paper feeder body provided below the guide rail bracket, and air outlets of a negative pressure fan located inside the paper feeder body communicate with air inlets of a drying air duct located at a front side of the paper feeder body.

2. The wide-format color printer according to claim 1, wherein the carriage comprises a carriage frame and a motor fixing bracket, the ink carrier is fastened at a front end surface of the carriage frame, the motor is fixed on the motor fixing bracket, and the motor fixing bracket is connected to the carriage frame via an elastic member of a top portion of the motor fixing bracket.

3. The wide-format color printer according to claim 1, wherein a bearing pulley block is provided on the carriage and is slidably connected to a plain shaft on the guide rail bracket.

4. The wide-format color printer according to claim 3, wherein the guide rails are located at top portions of two sides of the guide rail bracket respectively, or located on two inner side surfaces of the guide rail bracket.

5. The wide-format color printer according to claim 1, wherein the drying air duct is a duckbilled drying air duct, the air outlets of the negative pressure fan are located at bottom portions of two ends of the paper feeder body, and bended air transporting ducts are provided between the air outlets of the negative pressure fan and the air inlets located at two ends of the drying air duct.

6. The wide-format color printer according to claim 5, wherein a heating device is provided inside the drying air duct.

7. The wide-format color printer according to claim 1, wherein paper feeding wheels are provided in a cavity of the paper feeder body and are mounted from a side of the paper feeder body, and bearings at two ends of a rotation shaft of the paper feeding wheels are supported by paper feeding wheel end covers and are fixed at two ends of the paper feeder body respectively.

8. The wide-format color printer according to claim 1, wherein the printer further comprises a paper pressure flap and a paper lift-press adjusting shaft; a rear end of the paper pressure flap is mounted at a rear end of a bottom portion of the guide rail bracket, a front end of the paper pressure flap elastically presses against the paper feeding wheels of the paper feeder body; the paper lift-press adjusting shaft is rotatably mounted at a front side of the bottom portion of the guide rail bracket, a paper press lever is provided at one end of the paper lift-press adjusting shaft, and a protrusion is provided on an outer circumferential surface of the paper lift-press adjusting shaft and is configured to tilting the paper pressure flap.

9. The wide-format color printer according to claim 8, wherein the paper lift-press adjusting shaft is mounted in a circular hole at the bottom portion of the guide rail bracket, and a cross section of the paper lift-press adjusting shaft is of a comma shape with a tail portion pointing forward.

* * * * *